United States Patent
Kalliokulju et al.

(10) Patent No.: US 6,618,591 B1
(45) Date of Patent: Sep. 9, 2003

(54) MECHANISM TO BENEFIT FROM MIN AND MAX BITRATES

(75) Inventors: Juha Kalliokulju, Vesilahti (FI); Lauri Oksanen, Helsinki (FI); Matti Turunen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/429,384

(22) Filed: Oct. 28, 1999

(51) Int. Cl.[7] ................................................. H04Q 7/20
(52) U.S. Cl. ...................... 455/452; 455/67.3; 370/468; 370/477
(58) Field of Search ............................... 455/67.1, 67.3, 455/69, 452, 422, 435; 370/468, 445, 447, 448, 465, 441, 431, 437, 477; 375/225

(56) References Cited

U.S. PATENT DOCUMENTS

| | | | |
|---|---|---|---|
| 5,923,645 A | * 7/1999 | Okuda et al. | 370/230.1 |
| 6,072,787 A | * 6/2000 | Hamalainen et al. | 370/335 |
| 6,163,766 A | * 12/2000 | Kleider et al. | 704/229 |
| 6,374,112 B1 | * 4/2002 | Widegren et al. | 370/352 |

FOREIGN PATENT DOCUMENTS

WO          9949610          9/1999

OTHER PUBLICATIONS

UMTS 23.07 v0.4.0 (Apr. 1999) Universal Mobile Telecommunications System (UMTS); Qos Concept.

TS 25.401 v1.0.0 (Apr. 1999), 3rd Generation Partnership Project (3GPP); Technical Specification Group (TSG–RAN); UTRAN Overall Description.

TS 25.331 v1.1.0 (Jun. 1999): 3rd Generation Partnership Project (3GPP); Technical Specification Group (TSG) RAN; Working Group 2; RRC Protocol Specification.

"Wideband CDMA for Third Generation Mobile Communications", Ed. T. Ojanpera and R. Prasad, Artech House, Boston/London, 1998, pp. 13–21; 101–111; 165–169; 172–179.

"Quality of service management functions in $3^{rd}$ generation mobile telecommunication networks" by Juha Kalliokulju, 1999 IEEE Wireless Communications and Networking Conference, New Orleans, LA, USA Sep. 21–24, 1999, pp. 1283–1887, vol. 3, XP–002159388.

* cited by examiner

*Primary Examiner*—Dwayne Bost
*Assistant Examiner*—Ronald J. Ward
(74) *Attorney, Agent, or Firm*—Ware, Fressola Van Der Sluys & Adolphson LLP

(57) ABSTRACT

A link between a mobile station operating within a universal mobile telecommunications system (UMTS) is checked either at the mobile station itself or within a Radio Network Controller (RNC) of the UMTS to determine an error rate greater than a threshold. If found to be operating at greater than the error rate threshold, the bitrate of the link is reduced. If more than one PDP context is present then the PDP contexts can be reduced one at a time, according to selected criteria, until the error rate is reduced below the threshold. Once the interference is reduced to a level that will support the services at their former level, the mobile station can once again begin freely operating at a bitrate between the minimum guaranteed bitrate and a maximum bitrate, commencing randomly if under the control of the mobile station, or according to a timed sequence if controlled from the RAN.

7 Claims, 4 Drawing Sheets

MECHANISM TO BENEFIT FROM MIN AND MAX BITRATES

TECHNICAL FIELD

The present invention is related to the Universal Mobile Telecommunications System (UMTS) and, more particularly, to Packet Data Protocol (PDP) context Quality of Service (QoS) parameters.

BACKGROUND OF THE INVENTION

Quality of Service in UMTS has been the subject of an ETSI Technical Report UMTS 23.07 v0.4.0 (1999–04), which describes various QoS parameters related to throughput/bitrate, including maximum bitrate, which is defined as the maximum number of bits delivered by UMTS at a Service Access Point (SAP) within a measurement period, divided by the duration of the measurement period. Also, a guaranteed capacity minimum bitrate is defined as a guaranteed number of bits delivered by UMTS at a SAP within a measurement period (provided that there is data to deliver), divided by the duration of the measurement period. A UMTS Terrestrial Radio Access Network (UTRAN) overall description can be found in ETSI Technical Specification TS25.40 v1.0.0 (1999–04).

The maximum bitrate can be used to make code reservations in the downlink of the radio interface. Its purpose is to limit the delivered bitrate to applications or external networks with such limitations. The guaranteed bitrate may be used to facilitate admission control based on available resources, and for resource allocation within UMTS. Quality requirements expressed by e.g., delay and reliability attributes only apply to incoming traffic up to the guaranteed bitrate.

When the system becomes capacity restricted, the interference level in the radio interface will grow, and errors will occur to data packets. The problem is that errors start to occur more often for those users that are at their maximum (allowed or equipment limited) power, including those who comply with their traffic contract, i.e., the errors affect not only those whose used bitrate is more than "guaranteed", but all users. In simple terms, the users at the cell edge start to suffer first. The process is not random, but neither is it connected to the used vs. guaranteed bitrate if no control mechanism is introduced.

DISCLOSURE OF INVENTION

The invention provides a control mechanism to decrease the data rate used by the users that are exceeding their guaranteed rate in the presence of errors.

According to a first aspect of the present invention, a method for use in a universal mobile telecommunications system (UMTS) having a plurality of radio access networks (RANs) accessible by mobile stations in their vicinity, said RANs connected to a UMTS core network, wherein each of said RANs allocates capacity in response to demand for capacity from said mobile stations in their vicinity, said method comprising the steps of:
  each RAN allocating, for each connection to an associated mobile station, a guaranteed capacity minimum bitrate as well as a non-guaranteed maximum bitrate and communicating said guaranteed bitrate and said non-guaranteed bitrate to said associated mobile station along with an error rate threshold; and
  each associated mobile station determining an error rate, comparing said error rate to said error rate threshold, and freely using a bitrate between said minimum bitrate and said maximum bitrate for so long as said error rate does not exceed said error rate threshold, but in the event said error rate exceeds said error rate threshold, using a reduced bitrate until said connection is terminated or said error rate no longer exceeds said error rate threshold and again freely using a bitrate between said minimum bitrate and said maximum bitrate beginning a random time period after said error rate no longer exceeds said error rate threshold.

In further accord with the first aspect of the invention, said step of using a reduced bitrate is carried out for connections carrying plural bearer services by first reducing said bitrate for a selected one of said plural bearer services and then using a reduced bitrate for one or more others of said plural bearer services if said error rate remains above said threshold.

According to a second aspect of the present invention, a method for use in a universal mobile telecommunications system (UMTS) having a plurality of radio access networks (RANs) accessible by mobile stations in their vicinity, said RANs connected to a UMTS core network, wherein each of said RANs allocates capacity in response to demand for capacity from said mobile stations in their vicinity, said method comprising the steps of:
  each RAN allocating, for each connection to an associated mobile station, a guaranteed capacity minimum bitrate as well as a non-guaranteed maximum bitrate and communicating said guaranteed bitrate and said non-guaranteed bitrate to said associated mobile station;
  each RAN determining an error rate, comparing said error rate to said error rate threshold, and permitting free use of said connection at a bitrate between said minimum bitrate and said maximum bitrate for so long as said error rate does not exceed said error rate threshold, but in the event said error rate exceeds said error rate threshold, commanding use of said connection at a reduced bitrate until said connection is terminated or said error rate no longer exceeds said error rate threshold and again permitting free use of said connection between said minimum bitrate and said maximum bitrate beginning at a selected time after said error rate no longer exceeds said error rate threshold.

In further accord with the second aspect of the invention, said step of commanding use of said connection at a reduced bitrate is carried out for connections carrying plural bearer services by first commanding use of said connection at a reduced bitrate for a selected one of said plural bearer services and then only commanding use of said connection at a further reduced bitrate for one or more others of said plural bearer services if said error rate remains above said threshold.

These and other objects, features and advantages of the present invention will become more apparent in light of the detailed description of a best mode embodiment thereof, as illustrated in the accompanying drawing.

DETAILED DESCRIPTION OF PREFERRED EMBODIMENTS

Figure 1:
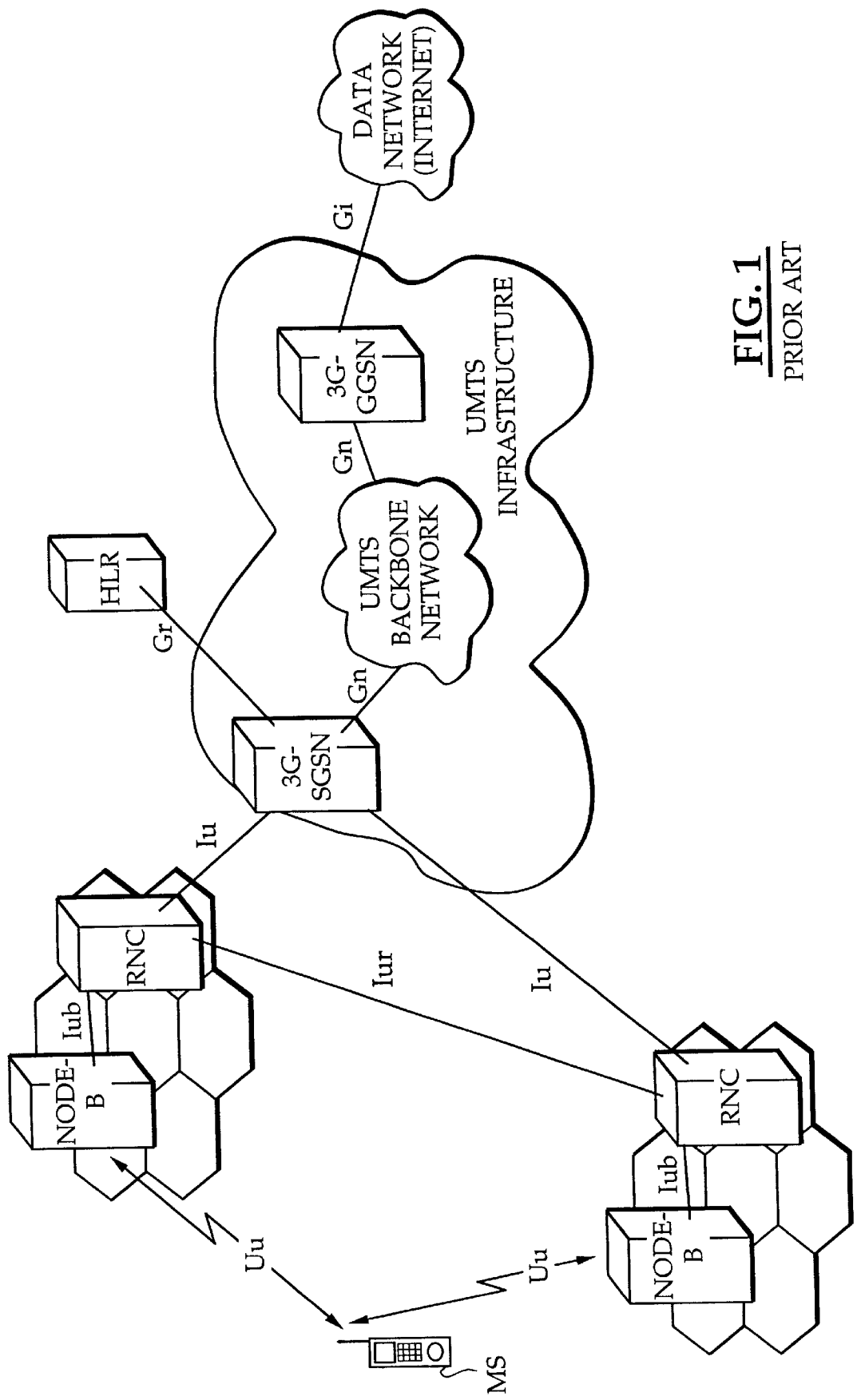
FIG. 1 shows a Universal Mobile Telecommunications System (UMTS) packet network architecture, according to the prior art.

The new Universal Mobile Telecommunications System (UMTS) packet network architecture as shown in FIG. 1 is highly related to the Global System for Mobile Communications (GSM) General Packet Radio System (GPRS). The biggest architectural difference is a new interface Iur between Radio Network Controllers (RNCs). The main purpose of Iur is to support macrodiversity, where data may be sent by multiple RNCs and composed in one serving RNC (SRNC). In the illustration of FIG. 1, Node B and RNC are together equivalent to the radio access network (RAN) which correspond to the combination of a Base Transceiver Station (BTS) and Base Station Controller (BSC) in GPRS, i.e., to a Base Station Subsystem (BSS). The radio interface $U_u$ between the UMTS Terrestrial Radio Access Network (UTRAN) and the User Equipment (UE) is in this case shown to be a Mobile Station (MS), but it should be realized it could be a different type of User Equipment (UE). The operation of low-level radio interface protocols is taken care of by the Radio Access Network (RAN). These protocols are, e.g., Radio Link Control (RLC), Medium Access Control (MAC) and physical layer (L1).

The Third Generation-Gateway GPRS Support Node (3G-SGSN) and Third Generation-Gateway GPRS Support Node (3G-GGSN) are UMTS versions of General Packet Radio System (GPRS) core network elements. The HLR serves its normal functions, but in a UMTS context. The 3G-SGSN participates in routing as well as mobility management and session management functions. It authorizes and registers new UMTS mobile stations located in its service area and transfer data packets between RMCs and 3G-GGSNs. The 3G-SGSN has main control of user connections, i.e., sessions. It supervises user initiated establishment, modification and release of connections and starts network-initiated modifications and release procedures.

The 3G-GGSN maintains the location information of the 3G-SGSN, which serves the mobile station where the packet is targeted. The main function of the 3G-GGSN is to make interworking functions between the UMTS network and the external network, e.g., the internet. These interworking functions include, e.g., mapping of external QoS to UMTS QoS.

UMTS defines a QoS concept (see the above-mentioned UMTS 23.07 v0.4.0 (1999.04) ETSI Technical Report) that provides a framework for QoS in UMTS. To keep the number of possible combinations of parameters to a manageable level, the above-mentioned technical report defines only four QoS classes, i.e., conversational, streaming, interactive and background classes. Each of these classes only uses the QoS parameters: delay, Bit Error Rate (BER), max bitrate and service precedence at different levels. Delay and BER are the parameters which, on the whole, define QoS class. Bitrate and service precedence are not considered to be decisive parameters. As a matter of fact, the max bitrate is not applicable to the interactive and background traffic classes. However, for the conversational and streaming classes, the max bitrate is in the range of 0–2 Mbs. It indicates the maximum data bitrate for the uplink and downlink separately, if it is used to reserve resources on the radio interface. For the conversational class, the maximum bitrate specifies the upper limit of the bitrate which the UMTS bearer delivers Service Data Units (SDUs.) and the SAPs. The UMTS bearer is not required to transfer traffic exceeding the guaranteed bitrate. Both the maximum and guaranteed bitrate attributes are used for resource allocation within UMTS. Minimum resource requirement is determined by guaranteed bitrate. When a conversational source generates less traffic than allocated for the bearer, the unused resources can, of course, be used by other bearers. The same may be said for the streaming class.

For both the conversational and streaming classes, there is the possibility of using a reliability QoS attribute which gives information on the reliability in terms of error ratio, etc. that the UMTS bearer provides. The error ratio is the relation between erroneous SDUs/bits and SDUs/bits requested to be transferred. The principles of the present invention can be applicable to one or both of SDU and bit error ratio applied to a given UMTS bearer. Additionally, reliability specifies whether the UMTS bearer shall deliver SDUs with detected errors or discard these SDUs.

According to the ETSI 3GPP Technical Specification entitled, "RRC Protocol Specification" TS25.331 v1.0.0 (1999–04), at Section 8.3.7, procedures are outlined relating to measurement and monitoring, with control procedures shown between the user equipment (UE) and the UTRAN. For instance, it is contemplated that a measurement control procedure can be initiated from the UTRAN side to control a measurement in a specific UE, as shown in FIG. 23 thereof. The UTRAN sends a measurement control message to the UE that includes information that controls the UE measurement. Such a measurement can include an error measurement. A measurement report can be in the opposite direction, as shown in FIG. 24 thereof from the UE to the UTRAN, and as discussed in Sec. 8.3.7.2 of the above-mentioned ETSI technical specification. The measurement report procedure is initiated from the UE side when the reporting criteria are met. The message is sent using either acknowledged or unacknowledged data transfer. The UE sends a measurement report message to the UTRAN that includes the measurement identity and the measured values of the requested measurement objects.

There are other similar procedures related to measurement and monitoring, such as transmission of UE capability information, direct transfers from the UE to the UTRAN or from the UTRAN to the UE. Message and information element functional definition and content are defined at Section 10 of the TS 24.331 Technical Specification. As will be evident to those of skill in the art, these generalized procedures can also be used for communicating message and information element content according to the present invention, such as shown in FIGS. 2, 3 and 4 discussed below.

Figure 2:
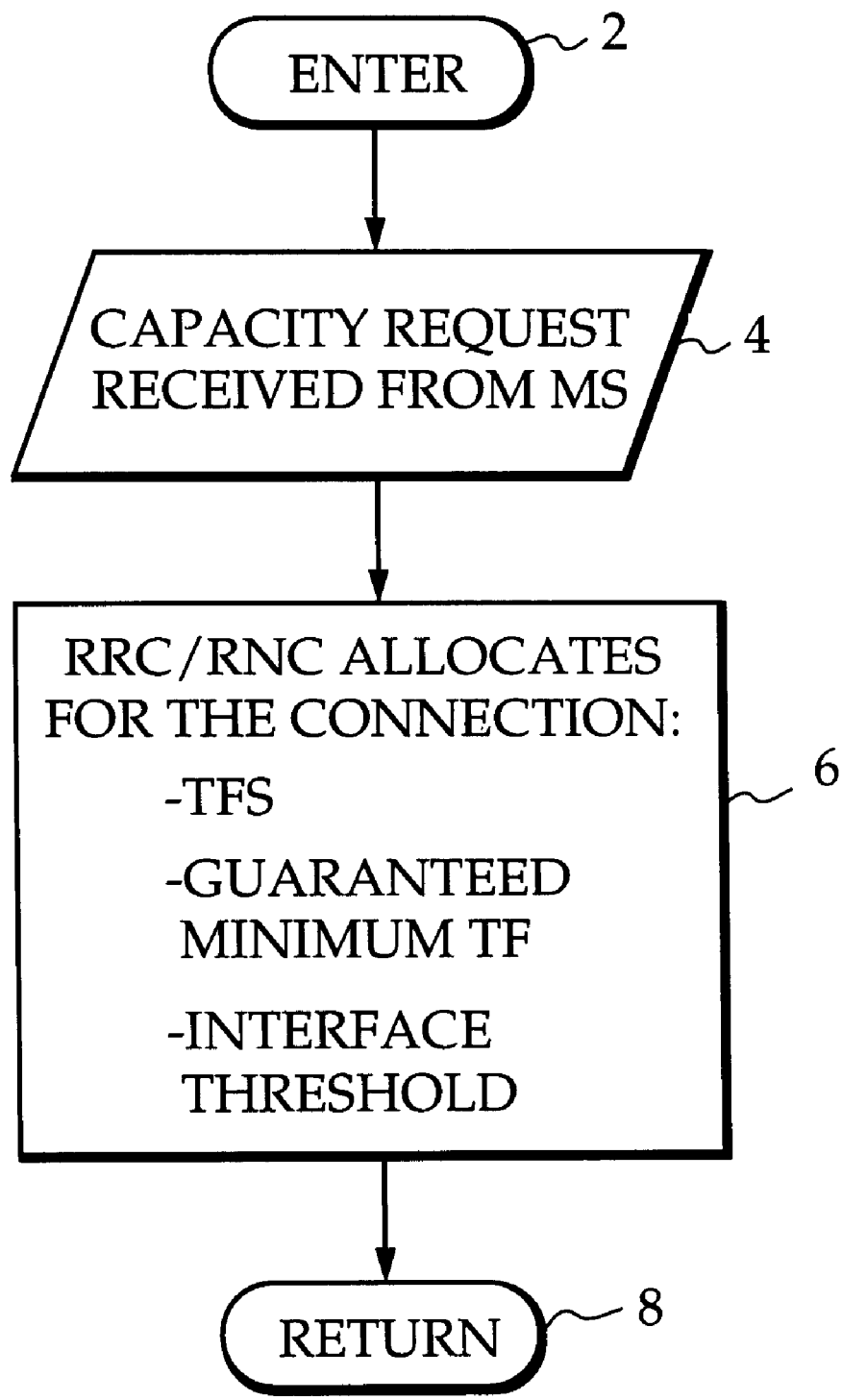
FIG. 2 shows the allocation of QoS parameters by a Radio Resource Control (RRC)/Radio Network Controller (RNC) in response to a capacity request received from a Mobile Station (MS), according to the present invention.

FIG. 2 shows such an interchange between a user equipment, i.e., a mobile station (MS) and the Radio Resource Control (RRC)/Radio Network Controller (RNC) of the UTRAN. After entering in a step 2, a capacity request is received in the UTRAN from the MS, as indicated in a step 4. The UTRAN then allocates, according to the capacity request, a transport format (TFS) including a maximum bitrate, a guaranteed minimum bitrate for the transport format, and an interference/bitrate threshold. A return is then made in a step 8.

Figure 3:
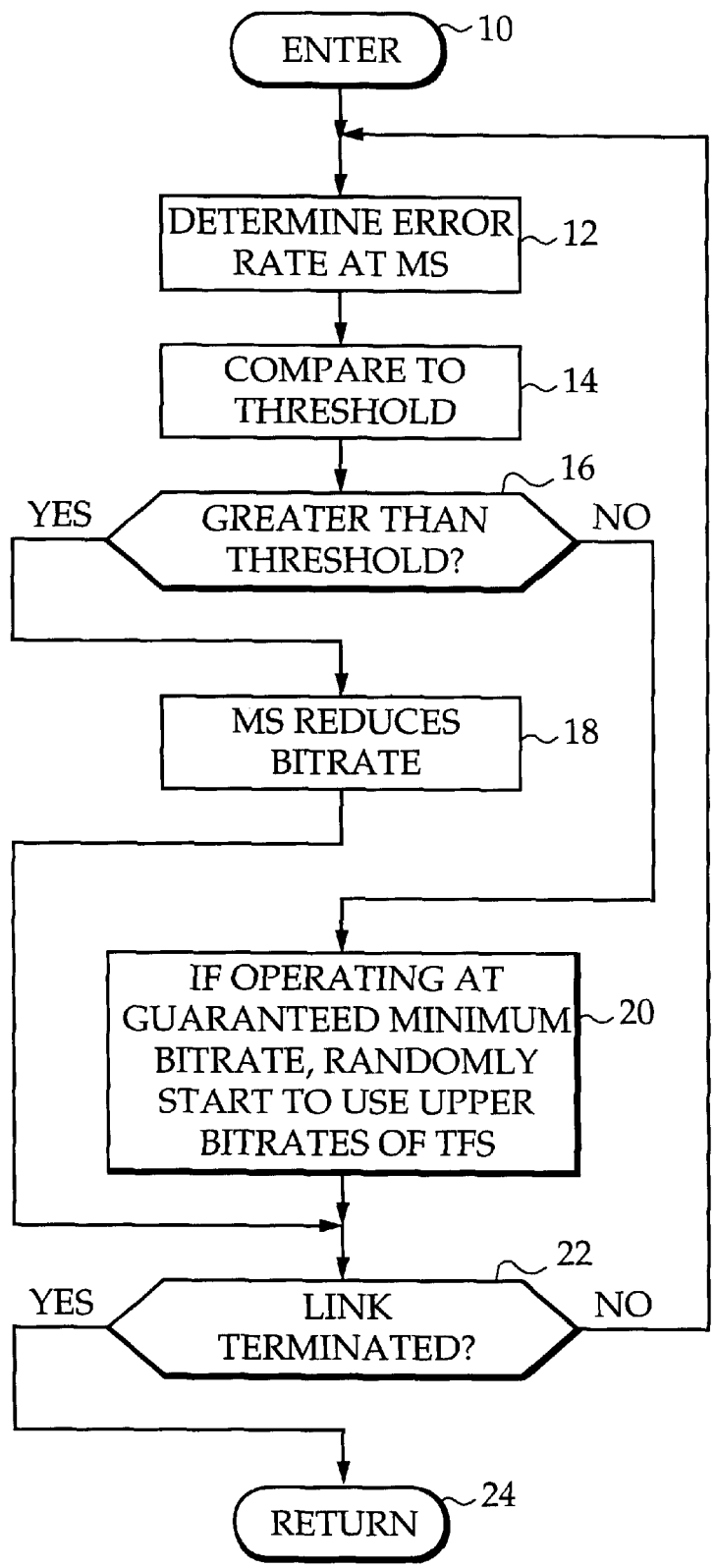
FIG. 3 shows, according to a first embodiment of the present invention, a method for determining error rate at the mobile station and reducing the bitrate in the presence of a determined error rate greater than a threshold.
Figure 4:
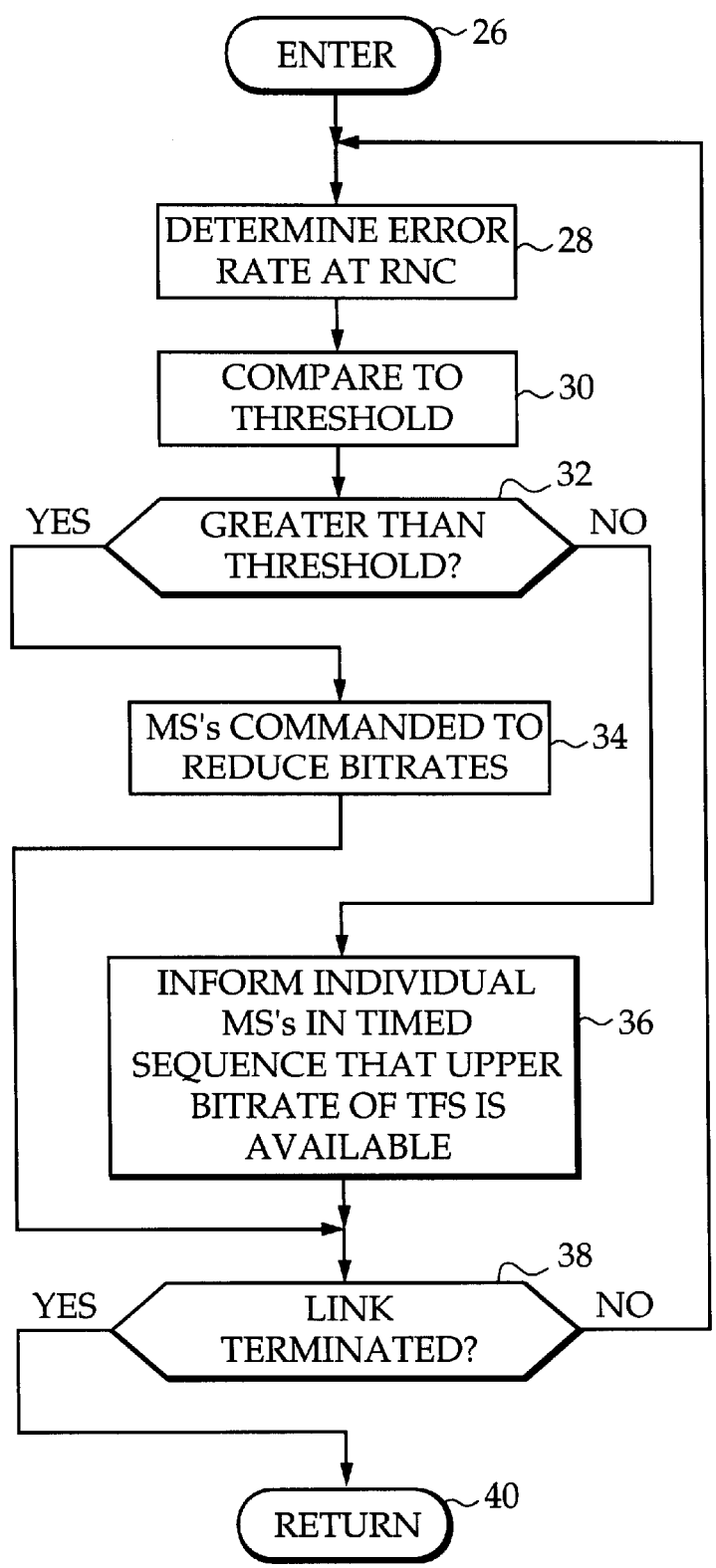
FIG. 4 shows, according to a second embodiment of the present invention, a method for determining error rate within the UMTS infrastructure and managing reduction of the bitrates of the various mobile stations in the presence of an aggregate error rate or individual rates greater than a threshold.

FIG. 3 is a flowchart showing a series of steps which may be executed, according to a first aspect of the present invention, after entering in a step 10. First, a step 12 is executed to determine the magnitude of a parameter such as the error rate (or another error parameter such as combined traffic load of mobile stations becoming too large, other mobile stations experiencing problems ("high error rate"), inadequate power or signal strength, unwanted intra-frequency effects, multiple retransmission or power-up requests within a certain number of blocks, or the like) of a connection existing between the mobile station and the UTRAN where the mobile station is freely utilizing the allocated capacity between the minimum guaranteed bitrate and the maximum bitrate, i.e., as needed.

It should be realized that the "determination" of the error rate can be carried out in a number of different ways. One of these can be a determination made by actual measurement at the mobile station. Another way is to make the actual measurement elsewhere, e.g., at the UTRAN side and communicate this information to the mobile station in the form of a UTRAN mobility information element, such as disclosed in the Third Generation Partnership Project (3GPP) Technical Specification Group (TSG) RAN, Working Group 2 (WG2) RRC protocol specification TS 25.331 v 1.3.0 (1999–06) at paragraph 10.2.6.5 concerning power control information, or paragraph 10.2.7.13 concerning the interfrequency measurement quantity.

Another example for step 12 mentioned above, is to have the UTRAN side notify the mobile stations about the combined traffic load generated by them becoming too large so that the mobile stations can reduce their bitrates before some of them experience problems. Otherwise the mobile stations close to the base station could easily use the maximum bit rates while some mobile stations close to the cell edge wouldn't even get the guaranteed minimum bit rate before running out of power. The invention teaches that the uplink interference level measured at the base station is an appropriate measure of the traffic load in the cell in question, in effect introducing a distributed uplink control mechanism that triggers before some individual mobiles experience any problems. It is difficult for the mobile station to deduce solely from its own measurements what the situation in the uplink is, except from the requested retransmissions, but even in this case it doesn't "know" if the problem is more that it is getting into a hopeless location concerning radio coverage or some other users are utilizing so much of the available capacity so as to effectively exclude others. It should therefore be realized that the invention covers the use of available information on the uplink loading, coming from the Radio Access Network (RAN) in the Broadcast Control Channel (BCCH) information element Uplink (UL) interference in the above-mentioned paragraph 10.2.6.5 concerning PRACH power control information in TS 25.331. In such cases, the mobile station "determines" the information elements from the broadcast control channel (BCCH) and makes the comparison of step 14 based on a measurement made elsewhere. In any event, a comparison is made at the mobile station between the error rate determined in step 12 and a threshold which has previously been communicated to the mobile station by the UTRAN (as shown in FIG. 2), e.g. by the RNC. If it is determined in a step 16 that the threshold has been exceeded by the determined error rate, the mobile station reduces the bitrate between itself and the UTRAN. For instance, if the connection between the mobile station and the UTRAN was transferring data at the maximum bitrate, the mobile station reduces the bitrate by reducing the bitrate of one transport format at a time (if the connection is carrying more than one bearer service) in the presence of an error rate greater than the threshold. This step is illustrated at a step 18 in FIG. 3.

It should be realized that one of the important concepts of UMTS is "PDP context" used to allocate PDP address, e.g., IPv4 to the user equipment, and secondly to make a logical connection with QoS through the UMTS network. It should also be realized that one user connection may have multiple simultaneous PDP contexts, i.e., plural bearer services, including multiple PDP addresses and QoS profiles that can be allocated simultaneously, according to steps similar to those shown in FIG. 2, for instance. PDP contexts are used and handled in the UMTS packet network elements shown in FIG. 1, including MS, 3G-SGSN, 3G-GGSN and HLR.

The set of QoS attributes negotiated for and utilized by one PDP context is referred to as a QoS profile and is activated by a known activation procedure, which practically speaking constitutes a connection establishment procedure. Each PDP context has a record, which consists of all required information for establishing a connection. These include PDP type, e.g., IPv4, PDP address, e.g., IPv4 address, QoS profile requested, including QoS parameters requested by the user, and QoS profile negotiated by the network. In the former GPRS, there was a drawback, in that only one PDP context was used for each PDP address. In the IP case, it meant that only one QoS profile could be utilized by all applications of a certain context, i.e., operating over one IP address. This problem is solved in UMTS by allowing multiple PDP contexts per one PDP address. There may be several PDP contexts with different kinds of QoS profiles using the same PDP address. Application data flows are divided to the correct PDP context in a packet classifier. Thus, it should be realized that the steps shown in FIGS. 2 and 3 (and FIG. 4 also) can be applied in a situation where multiple PDP contexts are present for a given user equipment. In such a case, if, for instance, an MS has several open PDP contexts and the error level exceeds the threshold, it is possible to reduce the overall bitrate by modifying the connections one at a time. For instance, if there is both a conversational and a streaming traffic class present at the same time, it may be decided in advance to give the conversational class precedence and reduce the bitrate of the streaming traffic first. Or, if one class is operating at a higher relative bitrate, it could be reduced first. Similarly, other criteria could be adopted, such as reducing first the one with the biggest BER or delay requirements.

Referring back to FIG. 3, if it were determined in the step 16 that the error rate determined in step 12 was less than the threshold, then instead of executing step 18, a step 20 is executed, to allow free use of the available bitrate above the guaranteed minimum by allowing as needed increases to the bitrate up to the maximum bitrate. Since it would be inadvisable for all mobile stations to execute this step at the same time, for instance, following a sudden overall reduction in error rate, it is best for the various mobile stations to randomly start to use higher bitrate levels when executing this step or to introduce some other comparable hysteresis function. For instance, each MS might take a random amount of time between, e.g., 0–100 frames or 0–1seconds, after which controlled-mode ends and MS can start to use upper bitrates of the TFS.

In any event, after execution of the step 18 or 20, a step 22 can be executed to determine if the link is terminated or not. If not, the step 12 is executed again, followed by the steps 14–22, as before. If the link is terminated, a return is made, as indicated in a step 24.

According to a second aspect of the invention, the determination of the error rate and the control determination (i.e.

the comparison step) and the need for a reduction of the rate (upon exceeding a threshold) can take place in the UTRAN rather than in the UE. For instance, after entering in a step 26, a step 28 is executed to determine the present error rate, for instance at the RNC of FIG. 1. This can be with respect to one or more mobile stations. As can be seen from FIG. 1, the RNC is ideally positioned to make this measurement, although it could conceivably be done elsewhere in the UTRAN. A comparison is then made, e.g., again within the RNC, as indicated in a step 30, and a determination made in a step 32 whether the threshold has been exceeded. If so, the RNC commands the various mobile stations to reduce their bitrates if operating above the minimum guaranteed bitrate, as indicated in a step 34. If the threshold is not exceeded, there is nothing more to be done unless, as indicated in a step 36, there are some mobile stations that are operating at the minimum bitrate. These can be informed in a timed sequence that the upper bitrate of the TFS is available. Once informed, they will then be free to increase their bitrate use above the minimum guaranteed bitrate up to the maximum bitrate (if not already doing so), as needed. After that, a determination is made in a step 38 if the link has been terminated or not. If not, the steps 28–38 are re-executed repeatedly until the link is terminated and a return is made in a step 40.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed:

1. Method for use in a mobile telecommunications system having a plurality of radio access networks (RANs) accessible by mobile stations in their vicinity, said RANs connected to a core network of said mobile telecommunications system, wherein each of said RANs allocates capacity in response to demand for capacity from said mobile stations in their vicinity, said method comprising the steps of:

each RAN allocating, for each connection to an associated mobile station, a guaranteed capacity minimum bitrate as well as a non-guaranteed maximum bitrate and communicating said guaranteed bitrate and said non-guaranteed bitrate to said associated mobile station along with an error rate threshold; and each associated mobile station determining an error rate, comparing said error rate to said error rate threshold, and freely using a bitrate between said minimum bitrate and said maximum bitrate for so long as said error rate does not exceed said error rate threshold, but in the event said error rate exceeds said error rate threshold, using a reduced bitrate until said connection is terminated or said error rate no longer exceeds said error rate threshold and again freely using a bitrate between said minimum bitrate and said maximum bitrate beginning a random time period after said error rate no longer exceeds said error rate threshold.

2. The method of claim 1, wherein said step of using a reduced bitrate is carried out for connections carrying plural bearer services by first reducing said bitrate for a selected one of said plural bearer services and then using a reduced bitrate for one or more others of said plural bearer services if said error rate remains above said threshold.

3. The method of claim 1, wherein the connection to an associated mobile station is a traffic connection; and wherein the error rate is a parameter of the traffic connection.

4. The method of claim 1, wherein the step of determining the error rate is accomplished in response to traffic uplink information that is broadcasted on a control channel from the radio access network.

5. The method of claim 4, wherein the uplink information includes uplink interference information.

6. Method for use in a mobile telecommunications system having a plurality of radio access networks (RANs) accessible by mobile stations in their vicinity, said RANs connected to a core network of said mobile telecommunications system, wherein each of said RANs allocates capacity in response to demand for capacity from said mobile stations in their vicinity, said method comprising the steps of:

each RAN allocating, for each connection to an associated mobile station, a guaranteed capacity minimum bitrate as well as a non-guaranteed maximum bitrate and communicating said guaranteed bitrate and said non-guaranteed bitrate to said associated mobile station; and each RAN determining an error rate, comparing said error rate to an error rate threshold, and permitting free use of said connection at a bitrate between said minimum bitrate and said maximum bitrate for so long as said error rate does not exceed said error rate threshold, but in the event said error rate exceeds said error rate threshold, commanding use of said connection at a reduced bitrate that is not between the minimum bitrate and the maximum bitrate, until said connection is terminated or said error rate no longer exceeds said error rate threshold and again permitting free use of said connection between said minimum bitrate and said maximum bitrate beginning at a selected time after said error rate no longer exceeds said error rate threshold, wherein said step of commanding use of said connection at a reduced bitrate is carried out for connections carrying plural bearer services by first commanding use of said connection at a reduced bitrate for a selected one of said plural bearer services and then only commanding use of said connection at a further reduced bitrate for one or more others of said plural bearer services if said error rate remains above said threshold.

7. Mobile station for use in a mobile telecommunications system having a plurality of radio access networks (RANs), said RANs being connected to a UMTS core network, and said mobile station being capable of demanding and receiving an allocated capacity from said RANs, said mobile station comprising:

means for receiving from a RAN a guaranteed capacity minimum bitrate as well as a non-guaranteed maximum bitrate, for each connection between the RAN and the mobile station;

means for determining an error rate and comparing said error rate to an error rate threshold; and means for using a bitrate between the minimum bitrate and the maximum bitrate for so long as said error rate does not exceed said error rate threshold, but in the event said error rate exceeds said error rate threshold, using a reduced bitrate until said connection is terminated or until said error rate no longer exceeds said error rate threshold, and subsequently again freely using said connection between said minimum bitrate and said maximum bitrate beginning at a random or selected time after said error rate no longer exceeds said error rate threshold.

* * * * *

UNITED STATES PATENT AND TRADEMARK OFFICE
CERTIFICATE OF CORRECTION

PATENT NO. : 6,618,591 B1
DATED : September 9, 2003
INVENTOR(S) : Kalliokulju et al.

It is certified that error appears in the above-identified patent and that said Letters Patent is hereby corrected as shown below:

Column 4,
Line 7, please change "SDUs." to -- SDUs --.

Signed and Sealed this

Twenty-fifth Day of May, 2004

JON W. DUDAS
*Acting Director of the United States Patent and Trademark Office*